B. M. PAYNE.
TWO ROW PLANTER.
APPLICATION FILED OCT. 13, 1913.
1,133,498.
Patented Mar. 30, 1915.
2 SHEETS—SHEET 2.
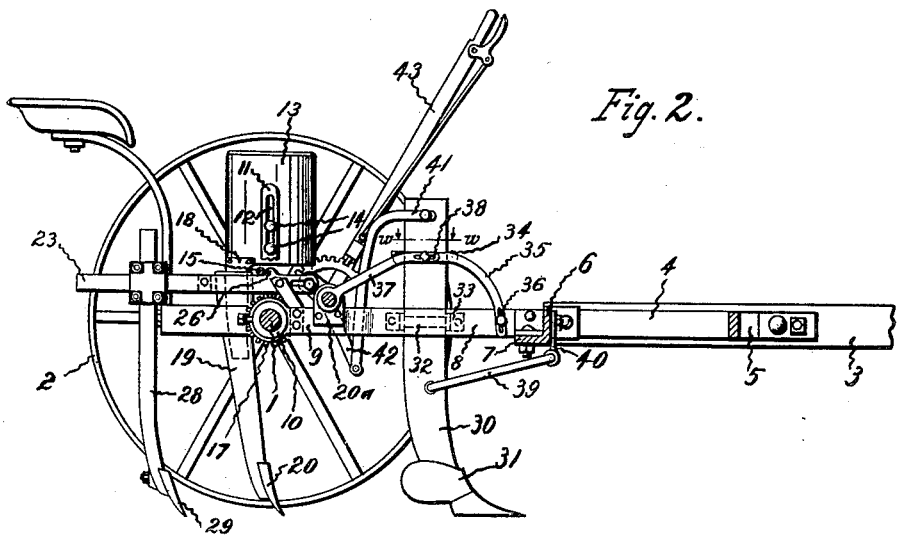
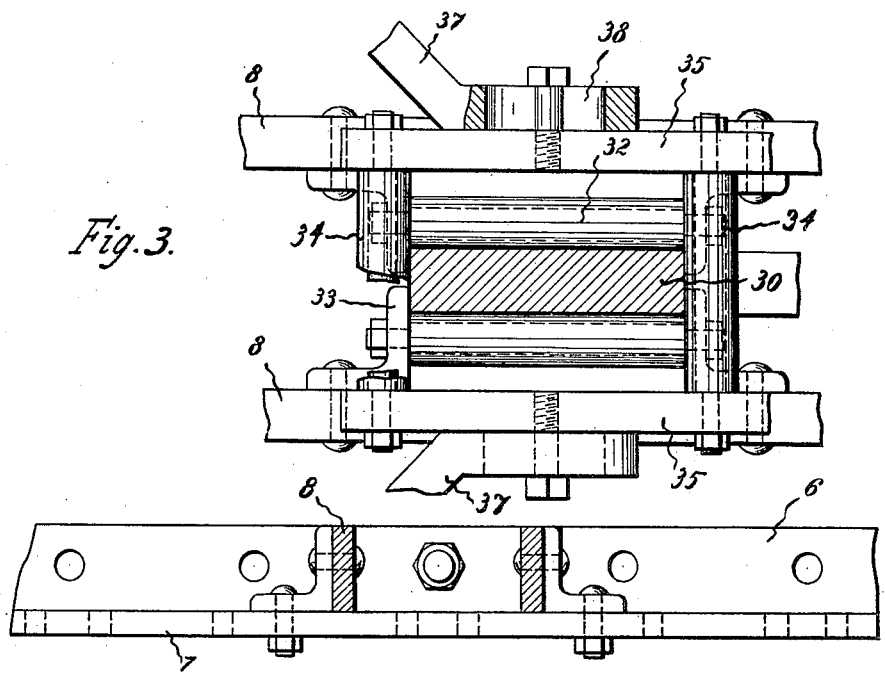
WITNESSES:
INVENTOR
B. M. Payne
BY
ATTORNEY

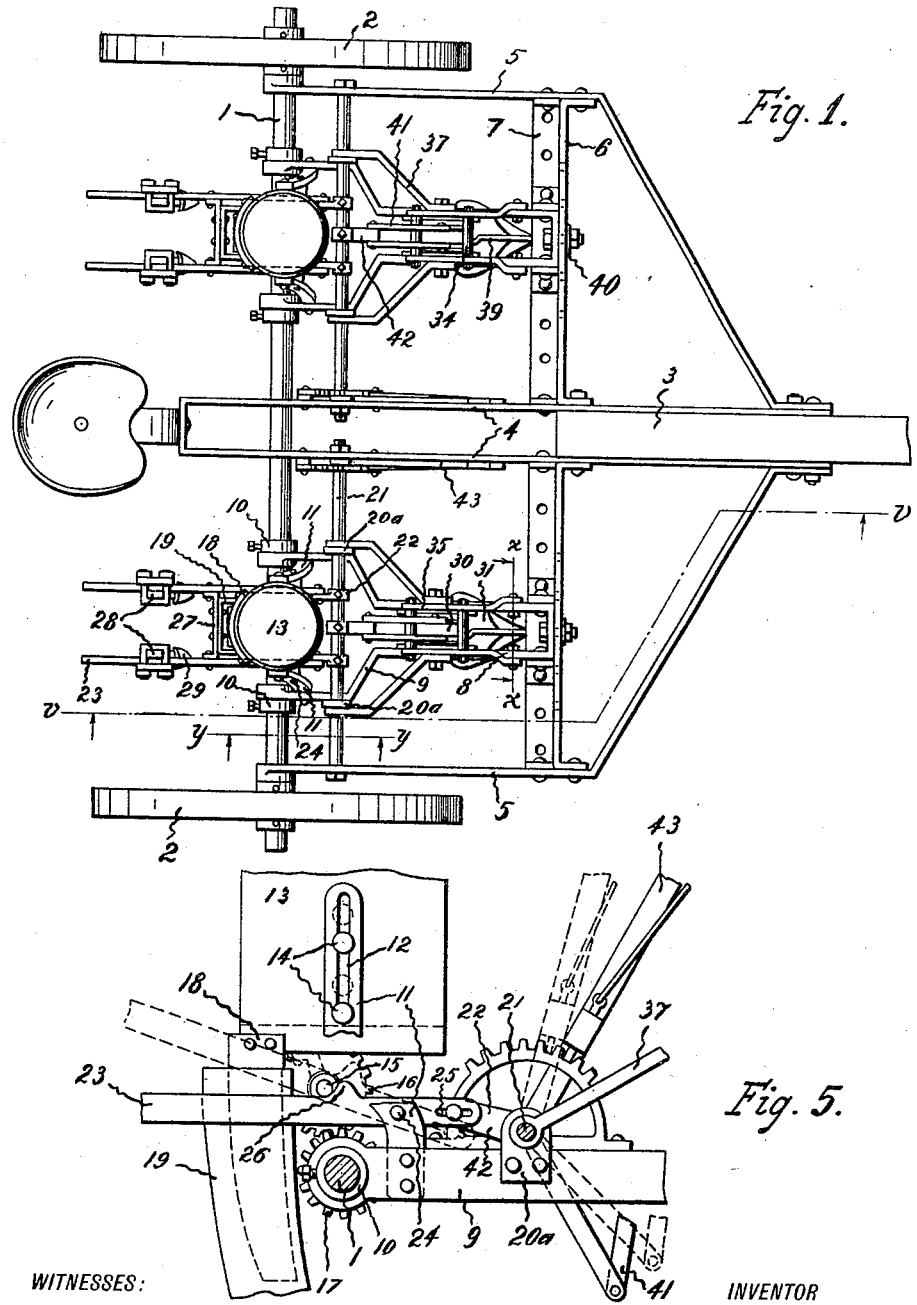

UNITED STATES PATENT OFFICE.

BISHOP M. PAYNE, OF SIDNEY, TEXAS.

TWO-ROW PLANTER.

1,133,498.

Specification of Letters Patent.

Patented Mar. 30, 1915.

Application filed October 13, 1913. Serial No. 794,774.

*To all whom it may concern:*

Be it known that I, BISHOP M. PAYNE, a citizen of the United States, residing at Sidney, in the county of Comanche and State of Texas, have invented certain new and useful Improvements in Two-Row Planters, of which the following is a specification.

My invention relates to a new and useful two-row planter. Its object is to provide a two-row planter, having its two planting mechanisms adjustable to or from each other, so that the distance between the rows of seed planted by the machine may be regulated.

Another object is to provide a two-row planter in which each planting mechanism may be separately adjusted vertically, without necessity of the operator leaving his seat.

Finally, the object of the invention is to provide a device of the character described that will be strong, durable, simple and efficient and comparatively easy to construct and the various parts of which will not be likely to get out of working order.

With these and various other objects in view, my invention has relation to certain novel features of the construction and operation, an example of which is described in the following specification, and is illustrated in the accompanying drawings, wherein:

Figure 1 is a plan view of the planter. Fig. 2 is a vertical sectional elevation of the same, the section being taken upon the line v—v of Fig. 1. Fig. 3 is a horizontal sectional view of a detail of construction, the section being taken upon the line w—w of Fig. 2. Fig. 4 is a vertical sectional view of another detail, the section being taken upon the line x—x of Fig. 1. Fig. 5 is a detail sectional view showing a certain lever mechanism for raising and lowering the plows, seed can and seed chute of each planting mechanism, the section being taken upon the line y—y of Fig. 1.

Referring now more particularly to the drawings, wherein like reference characters designate similar parts in all the figures, the numeral 1 denotes the axle of my planter, 2 designates the transporting wheels, and 3 the tongue, the latter being held spaced forwardly from the axle by a pair of parallel bars 4 respectively secured to the lateral faces of the tongue at their forward extremities, and receiving the axle in their rear portions, said bars being integrally connected at their rear ends. The primary members of the planter frame are two bars 5 having their rear extremities respectively mounted upon the axle adjacent to the transporting wheels, and having their forward portions bent toward the tongue at a forward inclination and secured thereto. The wheeled frame comprising the parts 1, 2, 3, 4, and 5 carries two planting mechanisms respectively disposed at each side of the tongue, and since these mechanisms are identical in construction, a description of one will suffice for both.

To the rear end of the tongue, there is secured one extremity of a bar 6 parallel to the axle, the other extremity of said bar being secured to the member 5. Contiguous with the lower edge portion of the bar 6, there is mounted just to the rear of said bar another bar 7, its extremities being respectively secured to the members 4 and 5. The bar 6 is mounted with its edge faces horizontal while the bar 7 is mounted with its edge faces vertical. The bars 6 and 7 in conjunction form an angular seat for the integrally connected forward extremities of two bars 8, which, after extending rearwardly for some distance are off-set to increase their spaced relation as indicated at 9, the rear extremities of said bars being mounted upon the axle, and respectively restricted from displacement from each other by a pair of set collars 10.

Just in front of the axle, there are respectively mounted upon the bars 8 two brackets 11, which, after curving slightly to the rear at their lower ends are extended vertically above the axle, the vertical portions of said brackets being formed with elongated slots 12. Between the vertical portions of said brackets, there is mounted a seed can 13 carrying headed pins 14 projecting through the slots 12 for the purpose of guiding the seed can during a slight vertical displacement thereof actuated by a means presently to be described. On the bottom of the seed can, there is mounted a shaft 15 carrying a pinion 16 serving to actuate the usual seed-feeding mechanism within the can (not shown). When the can is in its lowermost limiting position the pinion 16 will be intermeshed with and driven by a gear 17 mounted fast upon the axle beneath the seed can.

The seed chute comprises an inner member 18 and an outer member 19. The member 18 is secured at its upper extremity to the seed can and extends downwardly only a short distance. The member 19 is spaced slightly below the seed can at its top, and terminates adjacent to the ground at its lower extremity, which extremity carries an opening shovel plow 20. The chute member 19 has no direct connection with the seed can and the means for supporting said member will presently be described.

Just in front of the seed can, there is mounted upon the members 8 a pair of opposite brackets 20ª through which is passed a rock-shaft 21 parallel to the axle and having its extremities rotatably mounted in the members 4 and 5, respectively. Upon the middle portion of the rock-shaft 21 there is mounted fast a pair of spaced rearwardly projecting arms 22, which have pivotal connection at their free extremities with the forward ends of two substantially horizontal bars 23 passing beneath the seed can and pivotally mounted upon the brackets 11 as indicated at 24. In order to permit the rock-shaft 21 to communicate a slight angular displacement to the bars 23 through the arms 22, said bars 23 are slotted as indicated at 25 to receive the pivot pins carried by said arms. Beneath the seed can, there is formed upon each of the bars 23 a slight upstanding protuberance 26, which when the correlated bar 23 is swung to its upward limiting position will communicate a slight upward displacement to the seed can. Just at the rear of the seed can, the bars 23 are rigidly connected by a brace 27, which brace serves to support the outer chute member 19. To the rear of the brace member 27, there is mounted upon the bars 23 a pair of opposite standards 28 terminating adjacent to the ground at their lower extremities and carrying upon said extremities plow shovels 29.

Some distance in front of the rock-shaft 21, there is passed a vertical standard 30 which terminates adjacent to the ground at its lower extremity and carries upon said extremity a breaking plow 31. Between the members 8, the lateral faces of the standard 30 are respectively engaged by rollers 32 having their extremities journaled in angular brackets 33 mounted upon said bars 8. The upper portion of the standard 30 is mounted between two parallel rollers 34 engaging respectively the front and rear edges of the standard, the extremities of said rollers being mounted between the rearward extremities of parallel curved bars 35, extending forwardly at a downward inclination, and respectively bolted at their forward ends to the corresponding extremities of the members 8. In order that the members 35 may undergo a certain adjustment relative to the bars 8, (the nature of which adjustment will later be made clear), the forward ends of the bars 35 are vertically slotted to receive the bolts securing said ends to the correlated bars 8. To the rear extremities of the bars 35, there are respectively bolted the forward ends of two brace members 37 which are extended divergently rearwardly and downwardly, their rear extremities being mounted upon the rock-shaft 21 contiguous with the lugs 20ª. In order to permit a hereinafter explained adjustment of the standard 30, the forward ends of the bars 37 are horizontally slotted as indicated at 38 to receive the bolts connecting said extremities to the members 35. Beneath the bars 8, the standard 30 is connected by a forwardly extending swinging rod 39 with a bracket 40 depending from the member 6.

From the upper portion of the standard 30, a pair of curved elongated swinging links 41 are extended downwardly and pivotally connected at their lower extremities with an arm 42 rigidly projecting from the rock-shaft 21. Upon the inner extremity of the rock-shaft 21 and within easy reach of the operator, there is mounted fast upon said rock-shaft an upright lever 43 through which a manually applied rotation may be communicated to the rock-shaft. The lever 43 is correlated with the usual means for holding the same in various positions of angular displacement.

An explanation will now be given as to the use and operation of the various mechanisms embodied in my machine.

The member 31 serves as the furrow-opening plow and the two members 29 act as covering plows. The shovel plow 20 carried by the lower extremity of the chute serves to open a small seed-receiving furrow in the bottom of the main furrow opened by the plow 31. In the operation of my planter, it is at times desirable to simultaneously adjust the members 20, 29, and 31 vertically through a short distance, without disturbing the operation of the seed-feeding mechanism within the seed can. And it also, of course, is necessary at times, (as when the planter is traveling to or from its work) to raise the members 20, 29, and 30 from contact with the ground and also discontinue the operation of the seed-feeding mechanism. To achieve these results, I employ one lever in conjunction with each of my complete planting mechanisms, by the operation of which lever the members 29, 20, and 31 may be vertically adjusted to a certain extent without disturbing the position of the seed can, but by throwing the lever to one of its limiting positions, the plows will not only be elevated from the ground but the seed can will also be sufficiently raised to disengage the pinion 16 from the gear 17. When the lever 43 is swung to its forward limiting position, the partial rotation of the shaft 21 thus produced will lower the standard 30 and plow 31 to their lowermost limiting positions, and simultaneously the frame formed by the bars 23 and brace member 27 will be subjected to a pivotal displacement that will lower the chute member 19 and standards 28 to their lowermost limiting positions. As the lever 43 is swung rearwardly, the rotation of the rock-shaft 21 thus produced will result in a vertical displacement of the standard 30 due to the connection of said standard with said rock-shaft through the members 41 and 42. At the same time the bars 23, due to their connection with the rock-shaft through the arms 22, will be subjected to a pivotal displacement by which the chute member 19 and the standards 28 will be raised. As the lever 43 approaches its rearmost limiting position, the protuberances 26 carried by the bars 23 will come into contact with the bottom of the seed can and as the lever 43 completes its rearward motion, said protuberances will raise the seed can a sufficient distance to disengage the pinion 16 from the gear 17. Thus when the lever 43 is in its rearmost limiting position, the seed-feeding mechanism will be at the rest and the plows will be raised from contact with the ground so that the planter may travel freely from place to place without performing any of its functions.

The provision of the rollers 32 and 34 to guide the standard 30 during its vertical displacement reduces to a minimum the friction resulting from such displacement. The brace member 39 takes a considerable portion of the strain acting rearwardly upon the lower end of the standard 30 due to the pressure of earth against the plow 31, thus relieving the guide-rollers and adjusting mechanism of this strain.

It is at times desirable to adjust the extremities of the standard 30 forward or back so as to throw said standard at an angle with the vertical. To accomplish this result, the bolts securing the extremities of the bars 35 with the members 8 and bars 37 are loosened, whereupon the slots 36 and 38 will permit a slight motion of the bars 35, which motion will allow the upper extremity of the standard 30 to be shifted forward or back through a slight displacement. When this adjustment has been accomplished the said bolts will be again tightened holding the standard in the adjusted position.

When it is desired to shift the two planting mechanisms to or from each other, the bolts securing the forward extremities of the members to the bars 6 and 7 are temporarily removed and the set collars 10 are loosened. The planting mechanisms may now be shifted laterally to the desired positions, the forward extremities of said mechanisms being supported during said sliding displacement by the bars 7, and the rear portions of said mechanism being supported by the axle and the rock-shaft 21. After the lateral adjustment has been made, the bars 8 will again be established in a rigid relation with the members 6 and 7 and the set collars 10 will again be made fast upon the axle.

The invention is presented as including all such modifications and changes as properly come within the scope of the following claims.

What I claim is:

1. In a planter, the combination of a wheel supported main frame, a plow substantially vertically adjustable in the main frame, a lever mounted on the main frame, a connection between the lever and the standard, an auxiliary frame pivoted on the main frame and carrying shovels, a connection between the lever and the auxiliary frame at a point forward of the pivot points of said frame, and a seed can vertically adjustable on the main frame and having a part resting on the auxiliary frame in the rear of the pivot of the auxiliary frame whereby the seed can is adjusted vertically when the auxiliary frame is swung.

2. In a planter, the combination of a wheel supported main frame, a plow standard vertically adjustable in the main frame, a lever mounted on the main frame, a connection between the lever and the standard, an auxiliary frame pivoted on the main frame and carrying shovels, a connection between the lever and the auxiliary frame at a point forward of the pivot point of said frame, a seed can vertically adjustable on the main frame, a shaft carried on the bottom of the seed can and resting on the auxiliary frame in rear of the pivot point of the latter, the auxiliary frame being swung by the lever.

In testimony whereof I have signed my name to this specification in the presence of two subscribing witnesses.

BISHOP M. PAYNE.

Witnesses:
S. R. HICKMAN,
JACK A. SCHLEY.

Copies of this patent may be obtained for five cents each, by addressing the "Commissioner of Patents, Washington, D. C."